J. P. McGARRY.
ANTISKIDDING CHAIN FOR VEHICLE WHEELS.
APPLICATION FILED APR. 14, 1914.
1,153,936.
Patented Sept. 21, 1915.
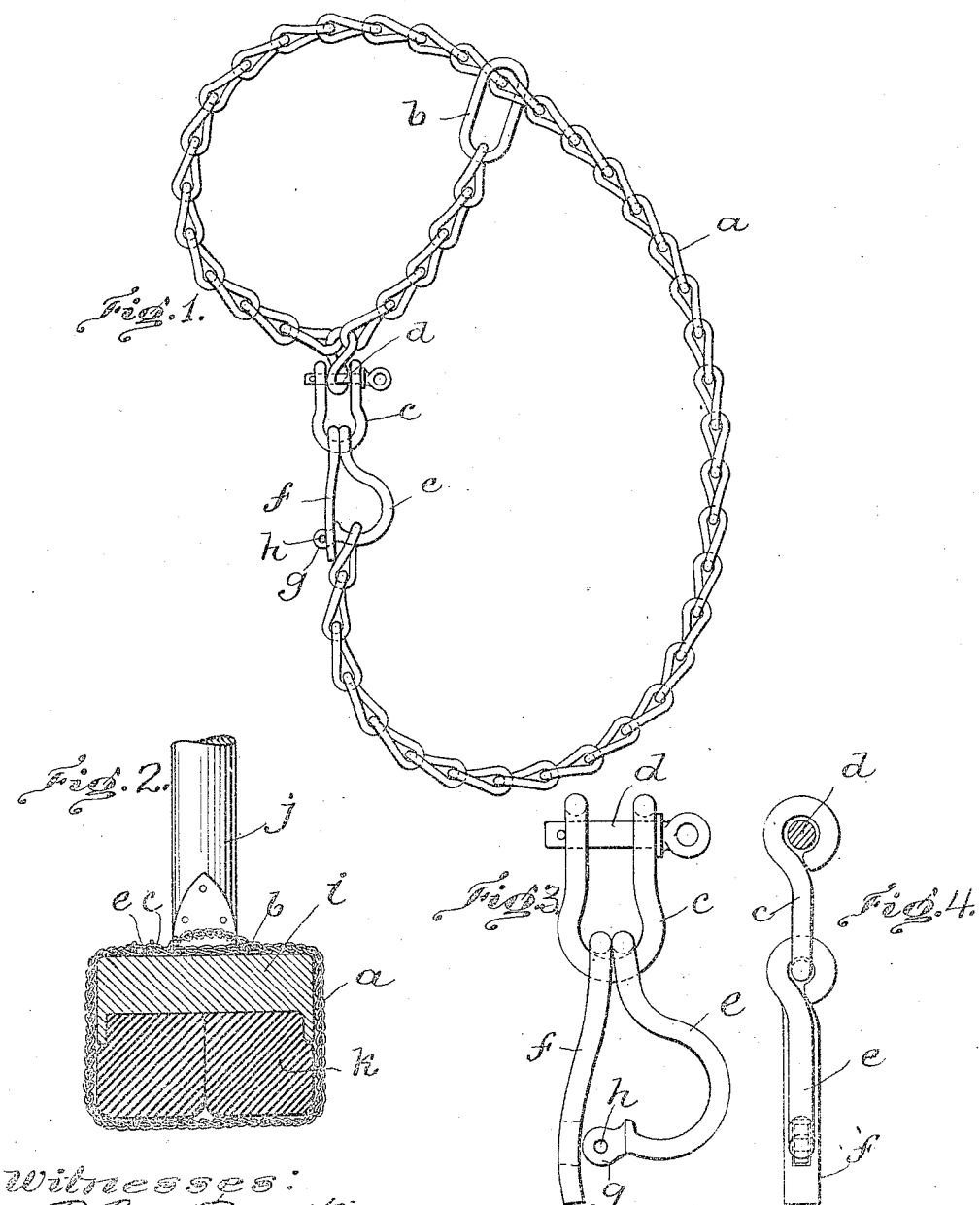

UNITED STATES PATENT OFFICE.

JAMES P. McGARRY, OF SOUTH BOSTON, MASSACHUSETTS.

ANTISKIDDING-CHAIN FOR VEHICLE-WHEELS.

1,153,936.  Specification of Letters Patent.  Patented Sept. 21, 1915.

Application filed April 14, 1914. Serial No. 831,749.

*To all whom it may concern:*

Be it known that I, JAMES P. McGARRY, a citizen of the United States, and resident of South Boston, in the county of Suffolk and State of Massachusetts, have invented certain new and useful Improvements in Antiskidding-Chains for Vehicle-Wheels, of which the following is a specification.

The present invention relates to chains adapted to be secured on vehicle wheels to prevent skidding, and being particularly designed and adapted for large and heavy motor vehicles such as trucks.

The object of the invention is to produce a chain which can be passed about the rim of the wheel and anchored to one of the spokes thereof, and may be quickly and easily adjusted so as to fit properly about the rim and spoke of a wheel of any size and design.

In the drawings in which I have illustrated the preferred embodiment of my invention, Figure 1 is a view showing by itself the chain in which I have embodied my invention. Fig. 2 is a sectional fragmentary view of a wheel rim and one of the spokes, showing my improved chain in place thereof. Figs. 3 and 4 are elevations of a detail of the chain.

The same reference characters indicate the same parts in all the figures.

My improved chain, which is indicated by the reference letter $a$, is made of links, preferably metallic links which however may be of any form, character or design. The only exception to this statement is the endmost link $b$, which must be sufficiently large to enable the other links to pass freely through it.

$c$ represents a shackle which may be of any desired character or form, and, as here shown, consists of a substantially U-shaped body and a bolt $d$, such bolt being detachably passed through the legs of the body and being adapted to pass also through any one of the links of the chain $a$.

$e$ represents a hook, preferably a safety hook having a guard $f$. The hook body and guard shown here are separate pieces, each having an eye which is threaded upon the shackle $c$. The body of the hook has also a lug $g$ adapted to pass through the slot in the guard, and the lug is provided with an aperture $h$ through which a locking pin or piece of any character may be passed. Any common or other desired form of locking hook which is capable of being engaged with a link of the chain and has efficient means for preventing disengagement therefrom may be used without departing from the spirit of my invention. It is also true that any type or form of shackle capable of being detachably connected with any one of the links of the chain, and capable also of carrying a hook may be used within the scope of my invention.

The chain is applied to a vehicle wheel by being passed first around one of the spokes and through the end link $b$, the chain being then carried around the rim and its end being finally connected with the hook $e$. The chain being made in the first place long enough to be passed around a spoke and the rim of the largest auto truck wheels made, may be readily adjusted to fit upon smaller wheels. Such adjustment is made by shifting the shackle from one link to another of the chain and by engaging the hook $e$ with some other link than the endmost one.

The mode of applying the chain to a truck wheel is illustrated in Fig. 2, where $i$ represents the rim, $j$ represents a spoke, and $k$ represents the tire of the wheel. The wheel here represented is one having a dual tire in which the spokes are placed midway between the opposite faces of the rim. The chain is as well applicable to a wheel in which the spokes are nearer one face than the other of the rim, since the length of each part of the chain, that is, of the parts which respectively surround the spoke and the rim, is independently adjustable.

The chain is so applied that the end link $b$ and the shackle $c$ lie on opposite sides of the spoke and between the spoke and the respectively adjacent faces of the rim. The circumference of the spoke being known either by measurement or by first passing the chain around the spoke, it is an easy matter to connect the shackle with that link of the chain of which the distance from the end link is most nearly equal to the semi-circumference of the spoke. This adjustment may be made for any size of spoke, whatever may be the size of the rim or the ratio between the dimensions of the spoke and rim. The chain having been passed about the spoke and through the link $b$, and then about the rim, it is drawn tight and the link which comes nearest the hook $e$ is then engaged with the hook. Thus the chain is secured about the rim tightly enough and is anchored by surrounding one of the spokes so that it can neither slip on the rim nor rub and chafe either the rim or the spoke.

I am aware that chains and other anti-skidding devices have been designed for application to a vehicle wheel by being passed around both a spoke and the rim. Such chains or other devices, however, are either incapable of ready adjustment, or they are liable to become tied into hard knots which can not easily be untied, or they are complicated and insufficiently strong for heavy work. My chain is sufficiently strong to be used upon the heaviest and most powerful trucks. It may be adjusted to a wheel of any size and proportions, as above described, and it is so designed that it will not be caused to bind under even the strongest pulling strains to which it may be subjected in use. As soon as the force is released, the chain may be readily slackened, disconnected and taken off.

For the purposes of description and of identifying the parts of the chain in the claims I may call those parts or loops of the chain which surround the spoke and the rim, respectively, the spoke-containing bight and the rim-containing bight. That portion of the chain to which the shackle c is connected may be termed the standing part, and the portion which passes through the link b and is carried around the rim may be called the running part. The term "shackle" which describes the particular connection c here illustrated is used in the following claims not as limited to the particular shackle shown, but with a broader significance as being intended to embrace any detachable coupling which may connect the hook with any chosen link of the spoke-embracing bight. Indeed it would not be a departure from my invention to eliminate the shackle c, or any other coupling altogether, and substitute for the hook e some other hook having means for directly connecting itself to a link of the chain. The essential feature is that the hook or other connection or coupling which is designed for holding the end which passes around the rim may be connected with any of the links which form the bight passing around the spoke. The hook is thus a coupling adapted to be connected with the chain at any one of several points in the bight which surrounds the spoke and also at any one of several points in the bight which surrounds the rim. Therefore the term "hook", unless otherwise qualified, as used in the following claims, is intended to cover not only the specific hook here shown but any other form of coupling capable of serving the same general purposes.

For most purposes it is preferable that the chain should be made of metallic links. However, I do not limit my invention to a chain so made, as it is conceivable that a flexible member made of other units than links might serve the purposes of the invention provided it were equipped with means for adjustably connecting the coupling or hook e at any one of several points of the standing part. Accordingly the term "chain" as used in this specification and the following claims, where so used without qualifications, is intended to embrace any flexible member having the essentials last indicated, whether the same is made of links or not.

What I claim and desire to secure by Letters Patent is:—

1. An anti-skidding device comprising a chain having a portion adapted to surround a spoke and having another portion adapted to surround the rim of a wheel, and a coupling constructed and arranged to connect in a non-sliding manner any one of several points in one of said portions to any one of several points in the other of said portions.

2. An anti-skidding device for wheels, comprising a chain having a loop on one end through which said chain may pass, a coupling detachably engaged with the standing part of said chain, such part having provisions with which said coupling may be engaged at other points, and means forming a part of the chain adapted to be passed around the rim of a wheel and to be engaged with said coupling at any one of a number of points.

3. A tire chain having at one end a link through which the chain may pass freely, and a coupling detachably connected with a link of the chain near said end link, and constructed to be so engaged with any other link, and said coupling including a hook adapted to be connected with a link at or near the opposite end of the chain.

4. An anti-skidding tire chain composed of links and having at one end a link large enough to permit the other links to pass freely through it, a shackle detachably connected with an intermediate link of the chain, and a hook carried by said shackle and adapted to be connected with any link near the opposite end of the chain to that with which the large link is connected.

5. In combination with a wheel, an anti-skidding chain comprising a standing part formed as a bight surrounding a spoke of the wheel, a link secured to such standing part, a running part passing freely through said link and movable through the same, and a coupling detachably connected with a link of the standing part and engageable with one of several links of the running part.

6. The combination with a vehicle wheel having a spoke, of an anti-skidding chain passing around said spoke and having a link at one side through which a running part of the chain passes, a coupling device attached to the chain at the opposite side of the spoke from said link, and the running part of the chain being passed around the rim of the wheel and connected to said coupling device.

7. An anti-skidding device comprising a chain having a link at one end sufficiently large to enable the chain to run freely through it, a shackle connected to an intermediate link of the chain at a distance from the aforesaid link substantially equal to half the circumference of the spoke of the wheel, and a hook connected to said shackle and being of dimensions and construction adapting it to pass through another link of the chain.

In testimony whereof I have affixed my signature, in presence of two witnesses.

JAMES P. McGARRY.

Witnesses:
  NAAMAN BREEDY,
  A. QUARLESS.